US007203162B2

(12) United States Patent
Bitar

(10) Patent No.: US 7,203,162 B2
(45) Date of Patent: Apr. 10, 2007

(54) LINK STATE RETRANSMISSION MECHANISM

(75) Inventor: Nabil Bitar, Winchester, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 984 days.

(21) Appl. No.: 10/012,689

(22) Filed: Oct. 30, 2001

(65) Prior Publication Data

US 2003/0081553 A1    May 1, 2003

(51) Int. Cl.
*H04L 12/00* (2006.01)
(52) U.S. Cl. .................. 370/229; 370/400; 370/465
(58) Field of Classification Search ............. 370/236, 370/235, 237, 351, 400, 254, 386, 389, 216–228, 370/238, 242, 238.1, 244, 331, 390, 392, 370/396, 397, 407, 395.1, 410–417, 408, 370/402; 709/242, 241, 238, 239, 249, 220, 709/219, 234, 235
See application file for complete search history.

(56) References Cited

U.S. PATENT DOCUMENTS

| 5,825,772 | A  | * | 10/1998 | Dobbins et al. ............ 370/396 |
| 6,711,171 | B1 | * | 3/2004  | Dobbins et al. ............ 370/400 |
| 6,801,496 | B1 | * | 10/2004 | Saleh et al. ................. 370/221 |
| 6,850,486 | B2 | * | 2/2005  | Saleh et al. ................. 370/218 |
| 2001/0033548 | A1 | * | 10/2001 | Saleh et al. ................. 370/218 |
| 2001/0048660 | A1 | * | 12/2001 | Saleh et al. ................. 370/216 |
| 2002/0054572 | A1 | * | 5/2002  | Saleh et al. ................. 370/254 |
| 2003/0179707 | A1 | * | 9/2003  | Bare .......................... 370/235 |
| 2005/0047327 | A1 | * | 3/2005  | Saleh et al. ................. 370/221 |
| 2005/0083949 | A1 | * | 4/2005  | Dobbins et al. ....... 370/395.53 |
| 2005/0135234 | A1 | * | 6/2005  | Saleh et al. ................. 370/218 |

* cited by examiner

*Primary Examiner*—Chau Nguyen
*Assistant Examiner*—Brian Roberts
(74) *Attorney, Agent, or Firm*—Matthew J. Hodulik

(57) ABSTRACT

The present invention enhances reliable flooding of link state advertisements (LSAs) using retransmission. In accordance with the present invention, a technique is disclosed to make a retransmission timer more responsive to dynamic network conditions. This technique varies the retransmission timer value as network conditions change providing the capability to alleviate the culmination of CPU utilization and memory resource exhaustion that may arise from fast retransmission while still achieving the object of fast flooding whenever possible. The retransmission timers provided by the present invention are assigned on a "per neighbor" basis.

17 Claims, 2 Drawing Sheets

LINK STATE RETRANSMISSION MECHANISM

FIELD OF THE INVENTION

The present invention relates generally to data networking, and more specifically to data networks employing routing protocols utilizing reliable flooding mechanisms such as in Open Shortest Path First (OSPF).

BACKGROUND OF THE INVENTION

The OSPF standard, RFC 2328, defines several timers that are important to OSPF behavior as a routing protocol. One of these timers is known as the retransmission timer. This timer is crucial to the reliable flooding of link state advertisements (LSAs) across the network. LSAs contain important information about a node from which they are generated, such as its links. An LSA is flooded hop by hop. Each node that sends an LSA to its neighbor (i.e. another node directly connected to it) awaits an acknowledgment that the LSA has been received. If the LSA is not received within the retransmission timer interval, the LSA is retransmitted. This cycle repeats until the LSA is acknowledged.

When a node comes under heavy load, CPU and memory resources become heavily utilized preventing an LSA from being processed in time, if at all. For instance, when the number of events that a CPU has to process exceeds the processing power of the CPU, a work backlog will be created and events will not be processed as soon as they arrive but will have to wait until the CPU can get to them. In the case of LSAs, if the waiting time exceeds the retransmission interval set at the sender of the LSA, an LSA retransmission will be triggered and the heavily utilized node will have one more copy of the LSA to process. In this case, the additional copies will not add any useful information but will consume "useless" CPU cycles at the transmitter and receiver.

Another problem will arise if buffer resources at the receiving end are exhausted. In this case, LSAs may be dropped and will not be seen by the CPU to process. Retransmission of LSAs under such conditions may be useful as it ensures reliable flooding. However, if performed in an uncontrolled fashion, most of the retransmissions may be useless work performed by the sender as the receiver is continuously dropping them.

In all known implementations of OSPF, the retransmission timer is fixed at system initialization. Therefore, the retransmission timer does not respond to dynamic load changes, particularly heavy loads, leading to a buildup in CPU required load at both the transmitter and receiver. The shorter the retransmission timer, the more retransmissions are likely to occur as the system becomes loaded and will lead to further load. The longer the retransmission timer, the longer it will take for the LSA to be flooded across a network if it is dropped somewhere in the network and the longer it will take for routing in the network to converge. Thus, some retransmission timer value may be good under certain situations and may be bad under others.

SUMMARY OF THE INVENTION

The present invention enhances reliable flooding of link state advertisements (LSAs) using retransmission. In accordance with the present invention, a technique is disclosed to make the retransmission timer more responsive to dynamic network conditions. This technique varies the retransmission timer value as network conditions change providing the capability to alleviate the culmination of CPU utilization and memory resource exhaustion that may arise from fast retransmissions while still achieving the object of fast flooding whenever possible.

In OSPF, a retransmission list is maintained per neighbor, whereas the retransmission timer is a property of the interface. There can be more than one neighbor communicating over the same interface. The present invention maintains a retransmission timer per neighbor that is derived from the interface timer. For each neighbor, the retransmission timer is initialized to that of the interface to which the neighbor belongs. As the number of retransmissions increases it is an indication that the neighbor is busy in the absence of channel errors. Retransmissions occur as a result of packet loss or delays in acknowledgments. An effective retransmission timer according to the present invention exceeds the round-trip time from sending time to acknowledgment reception. The present invention provides an estimation of the round-trip time from sending time to acknowledgement reception of an LSA. The retransmission timer is updated on a regular basis in order to reflect changing network conditions (e.g., neighbor CPU busy, traffic congestion). By dynamically adapting the retransmission timer to changing network conditions unnecessary retransmissions of LSAs are avoided.

In one embodiment of the invention, a methodology for implementing a reliable flooding mechanism according to the present invention includes the steps of assigning a current retransmission timer on a per neighbor basis to nodes transmitting the LSAs and transmitting initially the LSAs to said neighbors or retransmitting a number of the LSAs upon expiration of the current retransmission timer. The methodology also includes the steps of waiting a given time for acknowledgement by specific neighbors to which the LSAs were transmitted and altering, if necessary, the current retransmission timer after receiving the acknowledgement of the LSAs from the specific neighbors to more accurately reflect a specific acknowledgement cycle time in said network. The altered current retransmission timer is then utilized in a next transmission of corresponding LSAs.

BRIEF DESCRIPTION OF THE DRAWINGS

A more complete understanding of the present invention may be obtained from consideration of the following detailed description of the invention in conjunction with the drawing, with like elements referenced with like references, in which.

DETAILED DESCRIPTION

As discussed in the background, routing protocols such as Open Shortest Path First (OSPF) transmit an LSA from one router to another router and continue re-transmitting the LSA until it is acknowledged. This mechanism is known as reliable flooding. Each router maintains a link state retransmission list which is a list of LSAs that have been flooded but not acknowledged on a particular adjacency. The LSAs are retransmitted at set intervals until they are acknowledged or until the adjacency is destroyed. The retransmission mechanism can needlessly consume CPU and memory resources on both routers as well as bandwidth resources on the links between them. This invention addresses the problem via a new algorithm that still maintains the reliable flooding feature of OSPF but that also conserves CPU, memory and bandwidth resources.

The present invention is a technique for making the retransmission timer of a node more responsive to dynamic network conditions. The present invention enables dynamic variation of the retransmission timer value as network conditions change. The invention provides the capability to alleviate the culmination of CPU utilization and memory resource exhaustion that arises from fast retransmissions while still achieving the object of fast flooding whenever possible.

In an exemplary embodiment of the invention, as used in connection with the OSPF routing protocol, a retransmission list is maintained per neighbor. The retransmission timer is a property of the interface, where the interface is the connection between a router (node) and one or more routers. As would be understood, there could be more than one neighbor communicating over the same interface. An OSPF interface can be considered to belong to the area that contains the attached network. For example, all routing protocol packets originated by a router over a particular interface are labeled with the Area ID of the interface. A Router's LSAs reflect the state of its interfaces and their associated adjacencies. The LSA header, for example, contains the LS type, Link State ID and Advertising Router fields. The combination of these three fields uniquely identifies the LSA.

The improved link state retransmission mechanism of the present invention maintains a retransmission timer per neighbor that is derived from the interface timer. For each neighbor, the retransmission timer is initialized to that of the interface to which the neighbor belongs. As the number of retransmissions for a neighbor increases, in the absence of channel errors, it is an indication that the neighbor is busy. Thus, retransmissions occur as a result of packet loss or delays in acknowledgments. An effective retransmission timer according to the present invention exceeds the round-trip time from sending time to acknowledgment reception. Thus, in accordance with the present invention, an estimation of the round-trip time is made with a related value being utilized as the current retransmission timer.

Figure 1:
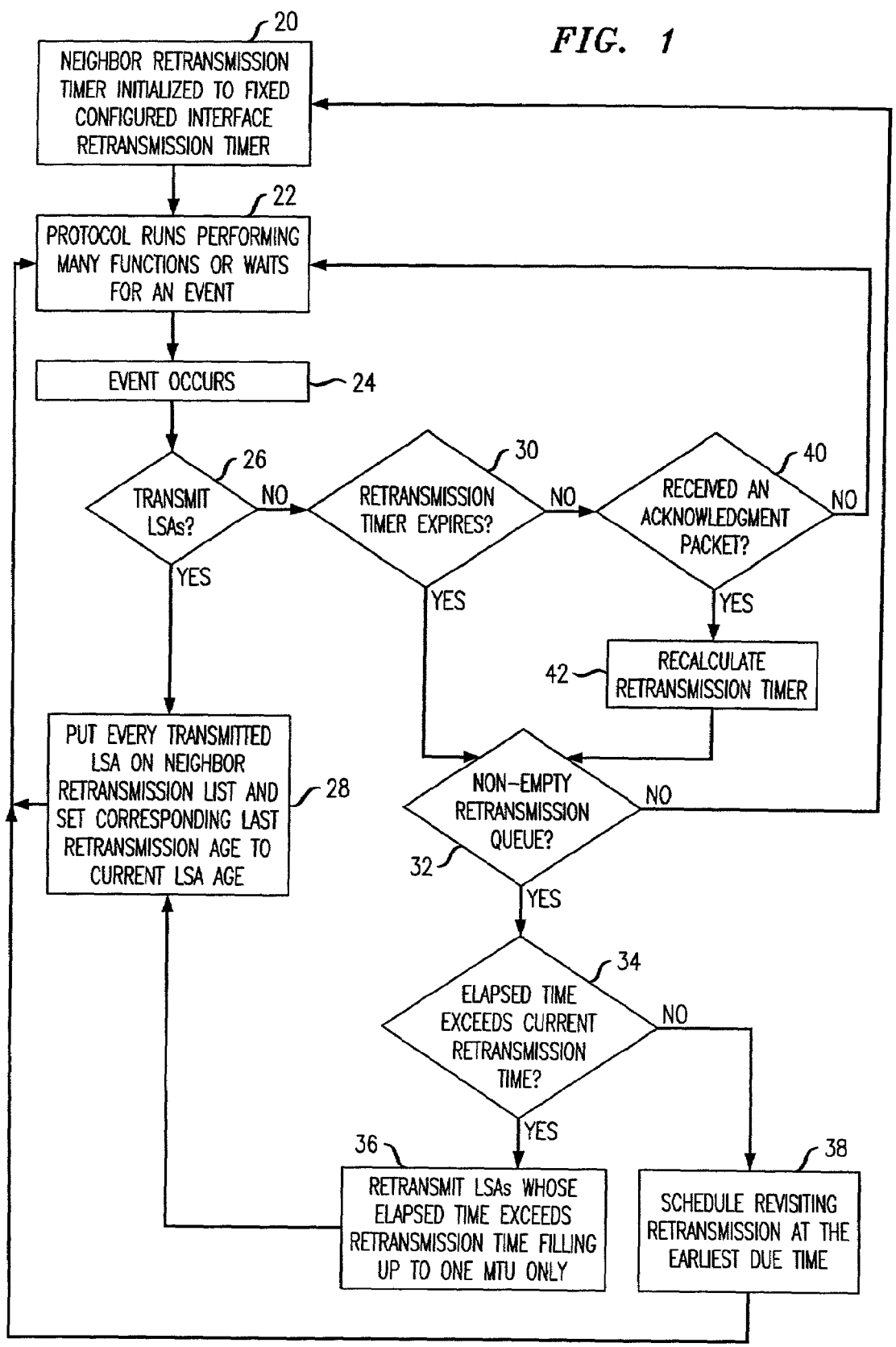
FIG. 1 is a flow diagram illustrating the methodology of the present invention.

A detailed explanation of a dynamic link state retransmission mechanism in accordance with the present invention is described. Referring to FIG. 1, a flow diagram 10 illustrating the steps involved in implementing the invention is shown. As a first step 20 in implementing the present invention, the current retransmission timer for a particular neighbor is initialized to the value set by the interface. Any retransmissions of LSAs are thus scheduled to be at the current retransmission time. At step 20, the router protocol operates, e.g., performing multiple functions and waiting for triggering events. If an event occurs 24 and it is an LSA transmission, the "Yes" path of decision block 26 is followed. At the next step 28, the last retransmission age of every LSA put on the retransmission list is initialized to the LSA age at that time. Otherwise, if the event that occurs corresponds to the retransmission timer expiration, the "Yes" path of block 30 is followed to step 32 where the retransmission queue is checked. If the retransmission queue is not empty, and there are LSAs existing at the head of the retransmission queue that become due to be retransmitted, the "Yes" path out of block 34 is followed. At the next step 36, up to one OSPF MTU (maximum transmission unit) is retransmitted. As would be understood, an MTU in the present example is equivalent to one OSPF packet which includes as many LSAs as can be contained therein. The number of LSAs that are included in an MTU depends on the LSA types and their sizes (e.g., the LSA size of a router depends on the number of links that the advertising router has in the area in which it is advertised). LSAs are due to be retransmitted when the current age of the LSA minus the last transmission age is greater than the current retransmission time (i.e. current_age−last retransmission age> current retransmission time. As an example, consider a device in which the current retransmission time of an LSA is 2 units. An LSA would be due to be retransmitted if the last retransmission age was 2 and the current age of the LSA was greater than 4. For each LSA put on the retransmission list (box 28), the retransmission time and LS age at time of retransmission are stored in a corresponding list element, which is a data structure that contains information about the LSA to be retransmitted. If there are no LSAs that are due to be retransmitted, schedule revisiting retransmission at the time difference between current retransmission timer and maximum elapsed time later (box 38) and proceed to step 22.

If an acknowledgement for any transmission or retransmission is received by the subject node before the current retransmission timer for that neighbor fires, and if it is an acknowledgment for an instance of the LSA on the retransmission list, the "YES" path of decision block 40 is followed and the new retransmission timer is computed in step 42. If no acknowledgment is received within the current retransmission time, the "NO" path of decision block 40 is followed and retransmission occurs as previously scheduled with the flow proceeding back to step 22. This assumes packet loss.

At step 42, the new retransmission time is computed where the new current retransmission time is equal to the maximum of either 1) the interface timer, 2) a multiple (can be set to any value greater than or equal to 1 and by default can be set to 2) of the link state age at time of transmission minus the age of the acknowledgement LSA plus the interface transfer delay plus the current time minus the retransmission time. Written another way: Current retransmission time=Maximum(interface retransmission timer, A*(LS age at time of retransmission−Acknowledgment LSA age+interface transfer delay+current time−retransmission time)). A is a tunable parameter that can be set to any value greater than or equal to 1 and has a default value of 2. Interface transfer delay is the value by which the age of the LSA is incremented before it is sent to the neighbor and it is defaulted to 1 in most implementations. In this equation, the difference between the LSA age at time of retransmission and the age of the acknowledged LSA plus the interface transfer delay estimates the delay in acknowledging an LSA when the LSA being acknowledged is for an earlier transmission or retransmission of the LSA rather than the latest (i.e., two retransmissions of the LSA may have occurred but the first retransmission is the one being acknowledged not the second). The difference between the current time and the last retransmission time is an estimate of the round trip delay including transmission delay and queuing delay at the subject node and the neighbor node. When the acknowledgment is for the last retransmission/transmission of the LSA, the difference between the current time and the retransmission time yields an estimate of the round trip time from transmission to acknowledgment. If the acknowledgment is for an earlier retransmission/transmission, this round trip time must be augmented by the difference in age between the age of the LSA being acknowledged and the one last retransmitted to have an accurate estimate of the overall delay.

At step 32, if the retransmission queue is empty, the flow proceeds back to block 20. Otherwise, the node checks if there are LSAs at the head of the retransmission list whose elapsed time exceeds the current retransmission time (box 34). The elapsed time is computed as (current age−last retransmission age). The router keeps track of the maximum elapsed time. If there are any LSAs that are due to be retransmitted, go to step 36. Otherwise, schedule revisiting retransmission at the time difference between current retransmission timer and maximum elapsed time later (box 38) and proceed to step 22.

The described invention optimizes bandwidth, CPU and memory utilization on routers and switches since needless retransmissions of LSAs are significantly reduced. The present invention is described with respect to routers and switches which make use of the OSPF routing protocol. The invention can also be implemented in conjunction with other reliable routing protocols that make use of reliable flooding such PNNI and ISIS.

Figure 2:
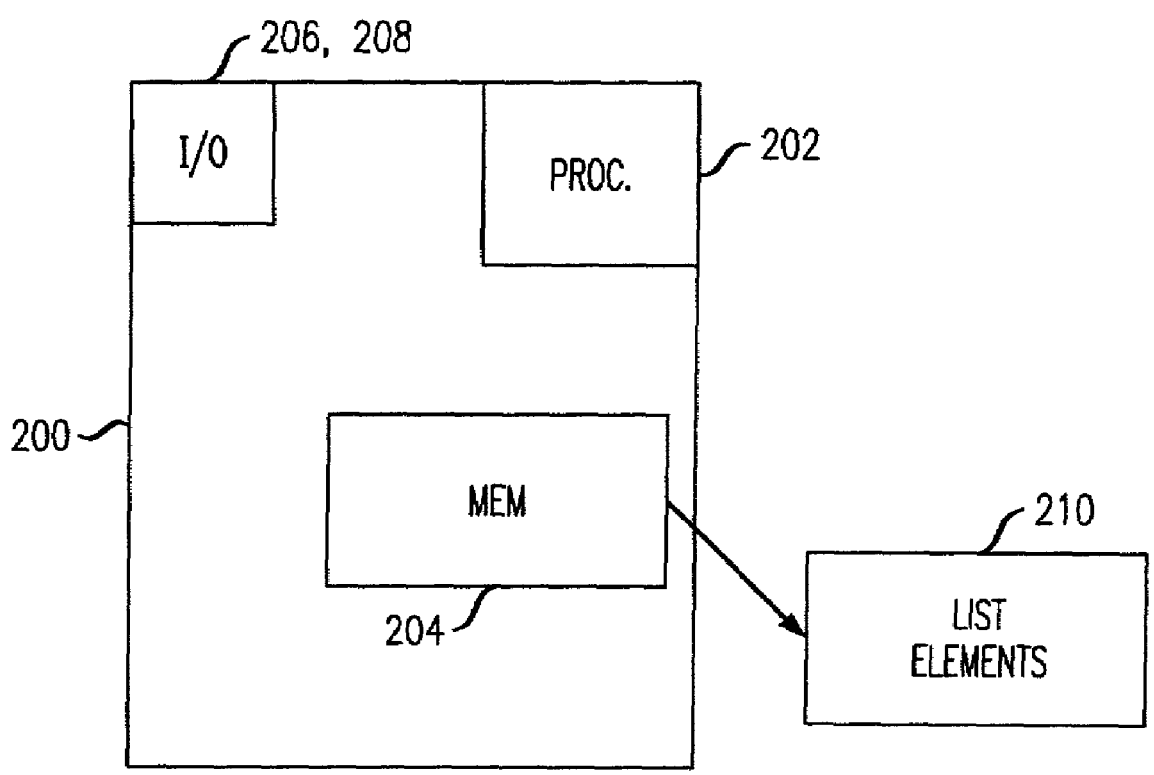
FIG. 2 shows one exemplary embodiment of a routing mechanism for implementing the methodology of the present invention.

Referring to FIG. 2, there is shown one exemplary embodiment of a router 200 which implements the methodology of the present invention. As can be seen, the router includes a processor 202 and associated memory 204, as well as input and output ports 206, 208. Within the memory 204 of the router corresponding list elements 210 are stored for the subject LSAs and or interfaces, where associated timer values, e.g., current retransmission timer, last retransmission age, etc., are stored.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims appended hereto.

What is claimed is:

1. A method of implementing a reliable flooding mechanism in a network, wherein retransmission by flooding of certain communications occur if said communications are not acknowledged within a given time, said method comprising the steps of:

assigning a given value for a current retransmission timer on a per neighbor basis to nodes transmitting said certain communications;

transmitting initially said certain communications to said neighbors or retransmitting a number of said communications upon expiration of said current retransmission timer;

waiting a given time for acknowledgement by specific neighbors to which said certain communications were transmitted;

altering, if necessary, said current retransmission timer after receiving said acknowledgement of said certain communications from said specific neighbors to more accurately reflect a specific acknowledgement cycle time in said network, said altered current transmission timer being utilized in a next transmission of corresponding certain communications, wherein a network protocol corresponding to said certain communications is selected from the group consisting of OSPF, PNNI and ISIS.

2. The method of claim 1, wherein at least said OSPF protocol, certain communications are Link State Advertisements (LSAs).

3. The method of claim 2, further including the step of recording a present age of said LSAs that are transmitted or retransmitted as a last retransmission age, wherein LSAs are due to be retransmitted when a current age of an LSA minus said last retransmission age is greater than said current retransmission timer.

4. The method of claim 1, wherein said current retransmission timer is altered as being the greater of either a corresponding interface timer value or a representation of delay in acknowledging said certain communications plus round trip time.

5. The method of claim 1, wherein said number of communications retransmitted corresponds to a maximum transmission unit of a corresponding protocol.

6. The method of claim 1, further including the steps of:
determining if a retransmission queue is empty subsequent to altering said current transmission timer and
determining whether the elapsed time of said communications exceeds said current retransmission timer, said communications being scheduled for retransmission if said elapsed time exceeds said current retransmission timer.

7. The method of claim 1, wherein said method repeats with said step of transmitting when communications remain in said retransmission queue to be retransmitted.

8. The method of claim 1, wherein said retransmission timer is initialized to a value of the corresponding interface.

9. The method of claim 3, wherein said representation of delay in acknowledging is given as $A*$(LS age at time of retransmission−Acknowledgment LSA age+interface transfer delay), where A is a multiple having a value greater than or equal to one (1).

10. The method of claim 9, wherein a said representation of round trip time is given as $A*$(current time−retransmission time), where A is a multiple having a value greater than or equal to one (1).

11. A method of transmitting Link State Advertisements (LSAs) in a packet network to reduce unnecessary retransmissions thereof, said method comprising the steps of:

initializing a current retransmission timer for LSAs of a particular neighbor to a given value;

transmitting initially said LSAs to said neighbors or retransmitting a number of said LSAs upon expiration of said current retransmission timer;

waiting a given time for acknowledgement by specific neighbors to which said LSAs were transmitted;

altering, if necessary, said current retransmission timer after, receiving said acknowledgement of said LSAs from said specific neighbors to more accurately reflect a specific acknowledgement cycle time in said network, said altered current transmission timer being utilized in a next transmission of corresponding LSAs, wherein a network protocol corresponding to said certain communications is selected from the group consisting of OSPF, PNNI and ISIS.

12. The method of claim 11, further including the step of recording a present age of said LSAs that are transmitted or retransmitted as a last retransmission age, wherein LSAs are due to be retransmitted when a current age of an LSA minus said last retransmission age is greater than said current retransmission timer.

13. The method of claim 12, wherein said current retransmission timer is altered as being the greater of either a corresponding interface timer value or a representation of delay in acknowledging said certain communications plus round trip time.

14. The method of claim 13, wherein said representation of delay in acknowledging and round trip time are given as A*(LS age at time of retransmission−Acknowledgment LSA age+interface transfer delay+current time−retransmission time), where A is a multiple having a value greater than or equal to one (1).

15. The method of claim 12, further including the steps of:
determining if a retransmission queue is empty subsequent to altering said current transmission timer and
determining whether the elapsed time of said communications exceeds said current retransmission timer, said communications being scheduled for retransmission if said elapsed time exceeds said current retransmission timer.

16. A routing apparatus for use in a packet network, said apparatus transmitting Link State Advertisements (LSAs) by flooding, wherein retransmission by flooding of said LSAs occurs if said LSAs are not acknowledged within a given time, said apparatus comprising:

means for initializing a current retransmission timer for LSAs of a particular neighbor to a given value;

means for transmitting initially said LSAs to said neighbors or retransmitting a number of said LSAs upon expiration of said current retransmission timer, said apparatus waiting a given time for acknowledgement by specific neighbors to which said LSAs were transmitted;

means for recording a present age of said LSAs that are transmitted or retransmitted as a last retransmission age, wherein LSAs are due to be retransmitted when a current age of an LSA minus said last retransmission age is greater than said current retransmission timer; and means for altering, if necessary, said current retransmission timer after receiving said acknowledgement of said LSAs from said specific neighbors to more accurately reflect a specific acknowledgement cycle time in said network, said altered current transmission timer being utilized in a next transmission of corresponding LSAs.

17. The apparatus of claim 16, wherein said current retransmission timer is altered as being the greater of either a corresponding interface timer value or a representation of delay in acknowledging said certain communications plus round trip time.

* * * * *